(12) United States Patent
Nahhas et al.

(10) Patent No.: US 11,535,506 B2
(45) Date of Patent: Dec. 27, 2022

(54) VEHICLE REFUELING SYSTEM WITH AUTOMATED FILL IDENTIFICATION, TRACKING AND BILLING PLATFORM

(71) Applicant: Instafuel LLC, Houston, TX (US)

(72) Inventors: Wisam Nahhas, Houston, TX (US); Nour Baki, Houston, TX (US); Josh Stolberg, Houston, TX (US)

(*) Notice: Subject to any disclaimer, the term of this patent is extended or adjusted under 35 U.S.C. 154(b) by 101 days.

(21) Appl. No.: 16/365,380

(22) Filed: Mar. 26, 2019

(65) Prior Publication Data
US 2020/0307987 A1 Oct. 1, 2020

(51) Int. Cl.
| | |
|---|---|
| B67D 7/04 | (2010.01) |
| G07F 13/02 | (2006.01) |
| H04W 4/40 | (2018.01) |
| H04W 4/80 | (2018.01) |
| G06Q 20/32 | (2012.01) |

(52) U.S. Cl.
CPC ....... B67D 7/0401 (2013.01); G06Q 20/3278 (2013.01); G07F 13/025 (2013.01); H04W 4/40 (2018.02); H04W 4/80 (2018.02); *B67D 2007/043* (2013.01)

(58) Field of Classification Search
CPC ............ B67D 7/0401; B67D 2007/043; B67D 7/145; B67D 7/04; G07F 13/025; H04W 4/40; H04W 4/80; G06Q 20/3278; G06Q 20/145

USPC .......................................... 705/28
See application file for complete search history.

(56) References Cited

U.S. PATENT DOCUMENTS

| | | | |
|---|---|---|---|
| 9,371,007 B1* | 6/2016 | Penilla | G06Q 20/145 |
| 2013/0035788 A1* | 2/2013 | Divelbiss | G05B 15/02 |
| | | | 701/99 |
| 2019/0108698 A1* | 4/2019 | Outwater | H04L 63/0428 |

FOREIGN PATENT DOCUMENTS

| | | | |
|---|---|---|---|
| WO | WO-0050335 A1 * | 8/2000 | B67D 7/145 |
| WO | WO-2009063471 A2 * | 5/2009 | G06Q 10/08 |

* cited by examiner

*Primary Examiner* — Russell S Glass
(74) *Attorney, Agent, or Firm* — Lloyd & Mousilli PLLC

(57) ABSTRACT

The present application discloses an automated system and method for a vehicle fueling service. The system comprises a plurality of first users with a smart device preloaded with a software application. The first users are associated with a carrier of a mobile fuel dispensing unit. An online server is configured for the interaction between the first user and a plurality of second users and an online non-transitory storage database for storing information corresponding to an asset or a vehicle. The smart device is communicatively coupled to a NFC tag stuck to each asset or vehicle for their identification and further accessing the information. The software application comprises an integrated automated billing module for creation of an invoice in real time and is configured to allow the first users to handle a plurality of request for using the vehicle fueling service at a time.

9 Claims, 5 Drawing Sheets

VEHICLE REFUELING SYSTEM WITH AUTOMATED FILL IDENTIFICATION, TRACKING AND BILLING PLATFORM

TECHNICAL FIELD

The present invention relates generally to the field of vehicle refueling and more specifically relates to an automated platform for the vehicle refueling system with automated fill identification, real time tracking and billing.

BACKGROUND

A motor vehicle, also known as motorized vehicle or automotive vehicle, is a self-propelled vehicle moving on land, air and water. All motorized vehicles consume fuel ranging from petrol, diesel, gas or any other type of combustible fuel. The remaining types of motorized vehicles require electricity provided by a source of battery for running. Thus, all motorized vehicles at some point of time require refueling of the fuels or the recharging or replacement of the batteries.

In modern times, the rapid development of the nation's economy has raised people's living standards. There are numerous types of motorized vehicles running on the road with different physical features and standards. It is to be particularly noted that different motorized vehicles have one specific thing in common-they all run on fuel and so each motorized vehicle has a refueling tank. Therefore, a number of refueling stations have been positioned along various parts of any particular city or along national highways.

The refueling or recharging of a motorized vehicle is traditionally performed at a refueling station. The refueling stations are located at specific dedicated locations and a driver of the vehicle is required to travel to the dedicated location in order to refuel or recharge the vehicle. This activity affects the driver's and vehicle's time management, cost management and energy management simultaneously. Furthermore, in case of an unanticipated, sudden running out of fuel, the vehicles are required to be towed down to appropriate locations for refueling or recharging. Moreover, the installation of the refueling stations require a purchase or lease of expensive land which affects the price of the fuels, thus making the fueling or recharging prices more expensive and unavailable in the areas where no economically priced land is available to support a refueling station.

It is to be noted that traditional fuel stations have certain problems which could be challenging in the foreseeable future. The traditional refueling stations involve manual operation which require hiring staff and this often leads to motorized vehicles queuing. Moreover, the queuing of vehicles becomes a deadly challenge in cold countries where snowfall halts access and drivers are forced to look for more remote refueling stations.

Different systems employing mobile devices were introduced in the market to overcome some of the above mentioned challenges. However, in the present scenario, there are various systems available in the market that are basically designed for on-site delivery of fuels but, unfortunately, identifying, tracking and billing the fills simultaneously that occur in the field is a difficult and cumbersome task. This is especially the case when faced with filling of hundreds of assets at a time and ensuring accurate recording with monitoring of fill data in real time, which does not exist in in the various existing systems.

SUMMARY

The present invention overcomes the above problems involving refueling of asset or vehicles by using the built-in NFC technology in mobile devices to identify an asset or vehicles and utilizing existing mobile platforms to run software that is robust enough to handle hundreds of requests at a time and providing integrated automated billing.

In view of the foregoing, an embodiment of the present invention herein provides a system which comprises a plurality of clients each having at least an asset or a motorized vehicle to be refuelled, an INSTAFUEL™ server, and a plurality of mobile refueling stations. Each asset or vehicle comprises an industrial NFC ID tag or a NFC sticker. Each NFC ID tag or A NFC sticker allows reading information stored in an INSTAFUEL™ database corresponding to each asset or motorized vehicle. Moreover, this system enables new assets or new motorized vehicle to get registered using software logic and prepare them for tagging. The NFC ID tag can be used to determine the fuel type (gas, diesel, premium, etc) that needs to be refilled in the motorized vehicle. One of the advantageous features of this invention is the capability to provide multiple options of fuels and thus it eliminates the need of dedicated fuel stations for different types of motorized vehicles. The NFC ID tag further provides geo-fencing to the asset or vehicle and prohibits a fill from occurring if the fill is occurring outside of an asset or vehicle's approved geo-fence.

In one of the embodiments of the present invention, each asset or motorized vehicle may further comprise a telematic device generating telematic data of the asset or motorized vehicle. The NFC ID tag is used to fetch the telematic data from the telematic device which can further be used to determine whether the asset or vehicle currently possesses a full fuel tank already or not.

In one of the embodiment, each client is provided with an INSTAFUEL™ dashboard to handle the creation of invoices in real time. The INSTAFUEL™ dashboard reads each fill and correctly stores the data in the database and the invoices are processed fully automatically using a logical function returning the price of the fuel for each client based on the contract with the clients. The invoices are automatically generated and communicated to each client via electronic means.

In one of the embodiments, each mobile refueling station is an INSTAFUEL™ delivery truck driven by a driver having a smart phone. The smartphone is preloaded with a software application with code logic enabling the driver to use the built in NFC technology to scan the NFC ID tag attached on the asset/vehicle. The software application is robust enough to handle hundreds of requests at a time and is integrated with automated billing to provide the client with the invoices on a real time basis. The software application installed on the driver's smart phone uses telemetric data. The telemetric data comprises information about the current status of the vehicle's fuel tank—whether it is full or empty. The application software is also embedded with code logic to add new assets and prepare them for tagging in case the asset/vehicle is not already tagged on the INSTAFUEL™ server.

In one of the embodiments, the INSTAFUEL™ delivery truck can be provided with a state regulated fuel meter, where the fuel meter has an ability to interact with the smart phone wirelessly ensuring correct measurement of the fuel being delivered to an asset and updating the client on a real time basis. Furthermore, a serial to wireless transponder can also be attached to the INSTAFUEL™ delivery truck to update the client on the real time basis.

In one of the embodiments, the software application installed uses different application programming interfaces.

These different programming interfaces allow accessing a private server which is further used to store data for display to customers. The application abstracts the data in a readable format. Moreover, an INSTAFUEL™ dashboard is created on the private server for creation of the invoices in real time. The logic here is mainly reading each fill, and correctly storing that data in the database. The invoice process is then fully automated, using a logical function that returns the price of the fuel for each client based on the contract INSTAFUEL™ has established with them. The invoice is then automatically communicated to each client via electronic means.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practised and to further enable those of skill in the art to practice the embodiments herein. Accordingly, the examples should not be construed as limiting the scope of the embodiments herein.

The embodiments herein achieve this by providing an automated integrated platform for the vehicle refueling system with automated fill identification, real time tracking and billing. The application software executes device to device communication technology to an automated platform for the vehicle refueling system with automated fill identification, real time tracking and billing.

Figure 1:
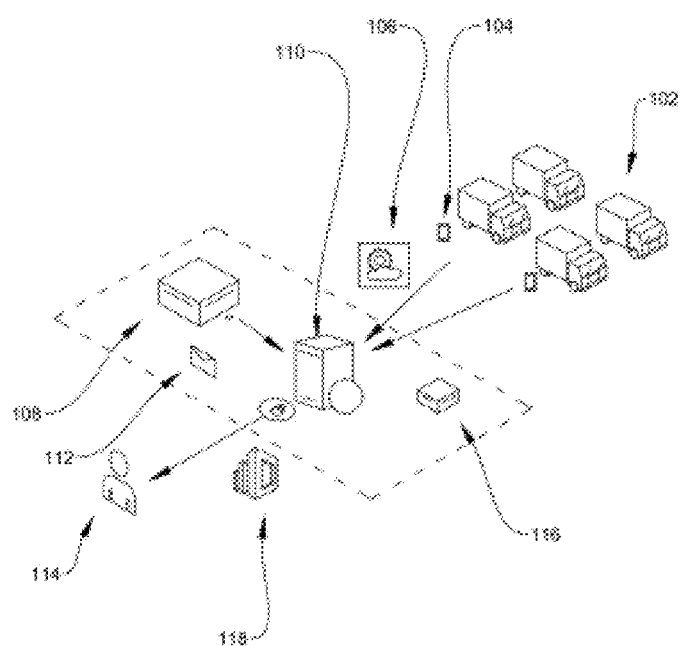
FIG. 1 illustrates a vehicle refueling system based architecture for automated fill identification, tracking and billing.

FIG. 1 is an illustration of the vehicle refueling system (100) based architecture for automated fill identification, tracking and billing. The system (100) mainly comprises of a plurality of INSTAFUEL™ fuel trucks (102) for the delivery of the fuel to the destined target location, a plurality of drivers' smart phones (104) are preloaded with an application, a website server (110) serving as a means for the interaction between a client (114) and a driver, a PostgreSQL database (108) for storing the information corresponding to an asset or vehicle, an email server (112) for interaction between the website server (110) and the PostgreSQL database (108) and the client (114). The INSTAFUEL™ trucks (102) are custom fuel trucks having serial to wireless transponder to update the client (114) on the real time basis, the trucks (102) is also comprises a state regulated fuel meter that is periodically checked and verified by the state to ensure the correct measurement of the fuel being delivered to an asset. The state regulated fuel meter has an ability to interact with the smart phone wirelessly thus updating the client (114) on a real time basis. Each driver's smart phone (104) is preloaded with an application with code logic enabling the driver to use the built in NFC technology in the smart phone device to scan the NFC tag stuck on the asset or vehicle. The application further runs software that is robust enough to handle hundreds of requests at a time and in integrated with automated billing to provide the client (114) with the invoices on real time basis. The application is also embedded with code logic to add new assets and prepare them for tagging in case the asset or vehicle is not already tagged on the INSTAFUEL™ server (110).

Figure 2:
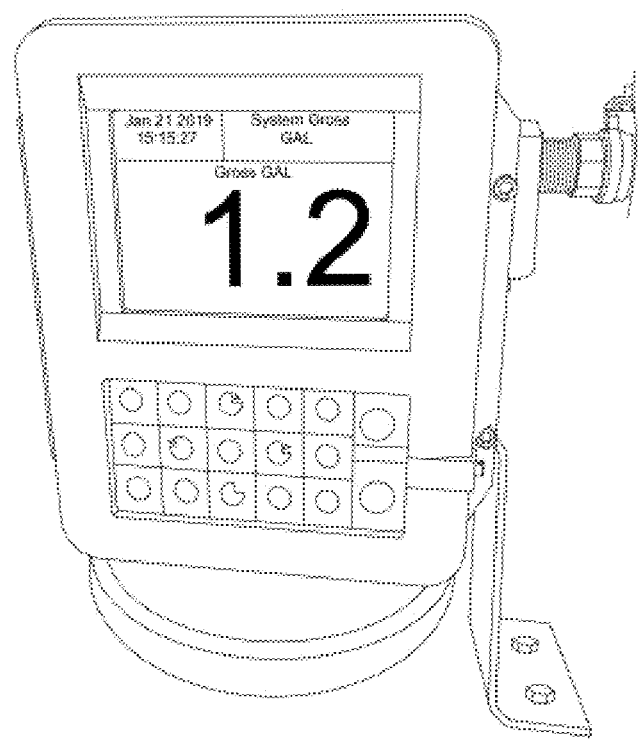
FIG. 2 illustrates a state regulated dual meter of the vehicle refueling system.

FIG. 2 is an illustration of a state regulated fuel meter of the vehicle refueling system that is periodically checked and verified by the state to ensure correct measurement of the fuel being delivered to the asset or vehicle. The fuel meter further has an ability to interact with the driver's smart phone (104) wirelessly and updating the client (114) on a real time basis of the measure of the fuel delivered to the asset or vehicle. The fuel meter can further be connected to a serial to wireless transponder to transfer the data of the meter over radio waves to the driver smart phone (104) or the client (114) directly.

Figure 3:
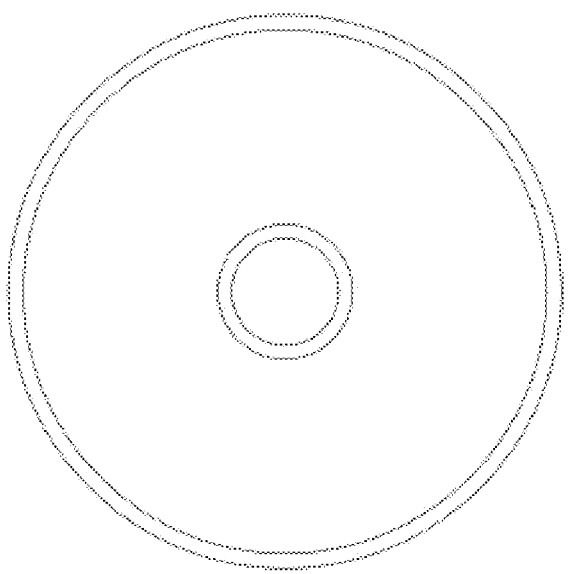
FIG. 3 illustrates an industrial NFC tag ID.

FIG. 3 is an illustration of an industrial NFC tag ID that is stuck on each asset or vehicle. Each industrial NFC tag is assigned an ID, stored in the INSTAFUEL™ database (108) that corresponds to the asset. The NFC tag ID is used to determine the fuel type to be delivered to a particular asset or vehicle, where the fuel type ranges from gas, diesel, premium etc. The NFC tag ID can be used to pull the data from a third party source such as a telematic device attached to the asset or vehicle. The telematic data may be used to determine whether the asset has a full fuel tank already or not. The NFC tag ID further provides geo-fencing to the asset or vehicle and prohibits a fill from occurring if the fill is occurring outside of the asset or vehicle's approved geo-fence.

Figure 4:
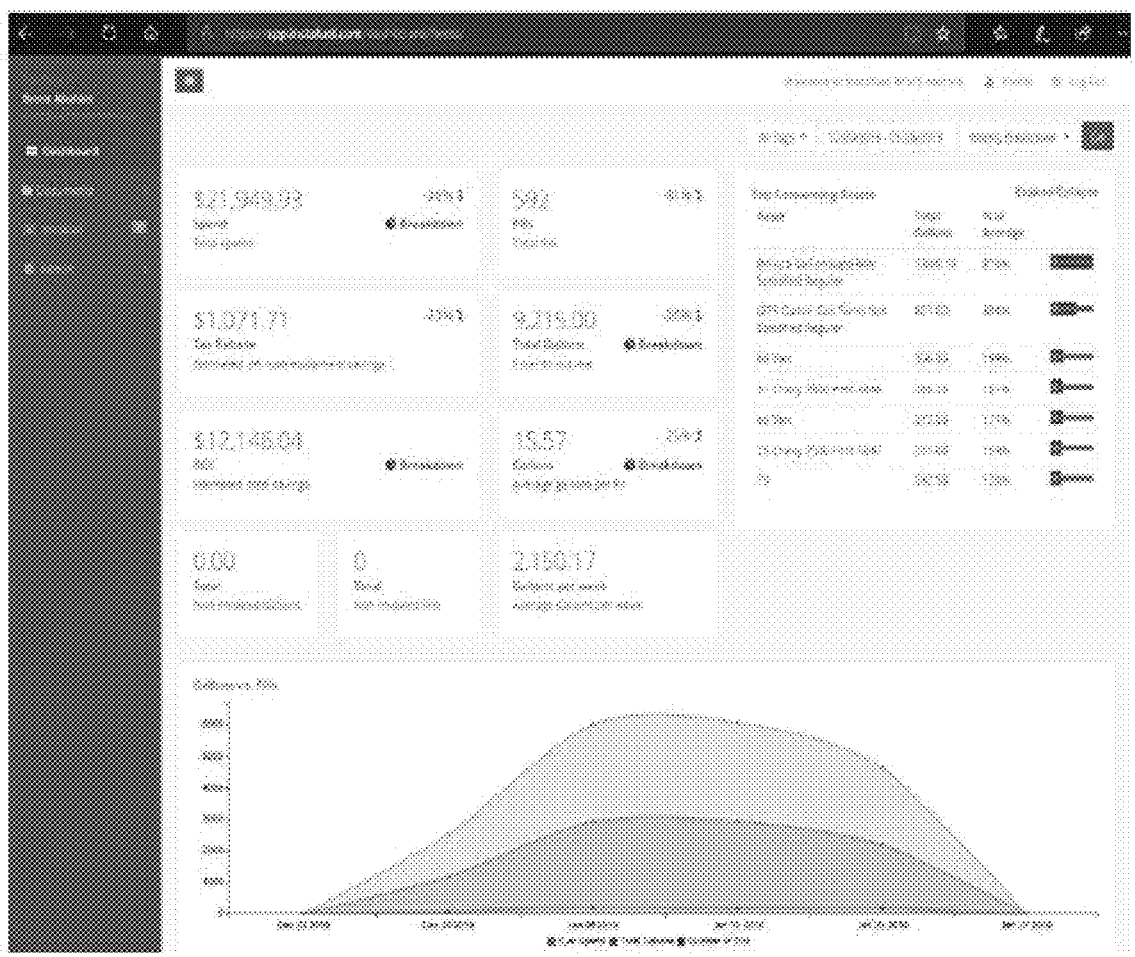
FIG. 4 illustrates a customer facing dashboard of a smart phone application.

FIG. 4 is an illustration of a customer facing dashboard which is the INSTAFUEL™ dashboard that displays the total expenditure weekly; total tax of the weekly breakdown, total estimated savings, total number of fills in a week, total fill volume in gallons, and average gallons per fill. The dashboard also provides a graphical representation of gallons versus fills. The INSTAFUEL™ dashboard can display fill data of any time interval. The customer facing dashboard further displays the top consuming agents. The INSTAFUEL™ dashboard reads each fill and correctly stores the data in the database (108) and the invoices are processed fully automatically using a logical function returning the price of the fuel for each client based on the contract INSTAFUEL™ established with them. The invoices are automatically communicated to each client via an electronic means.

Figure 5:
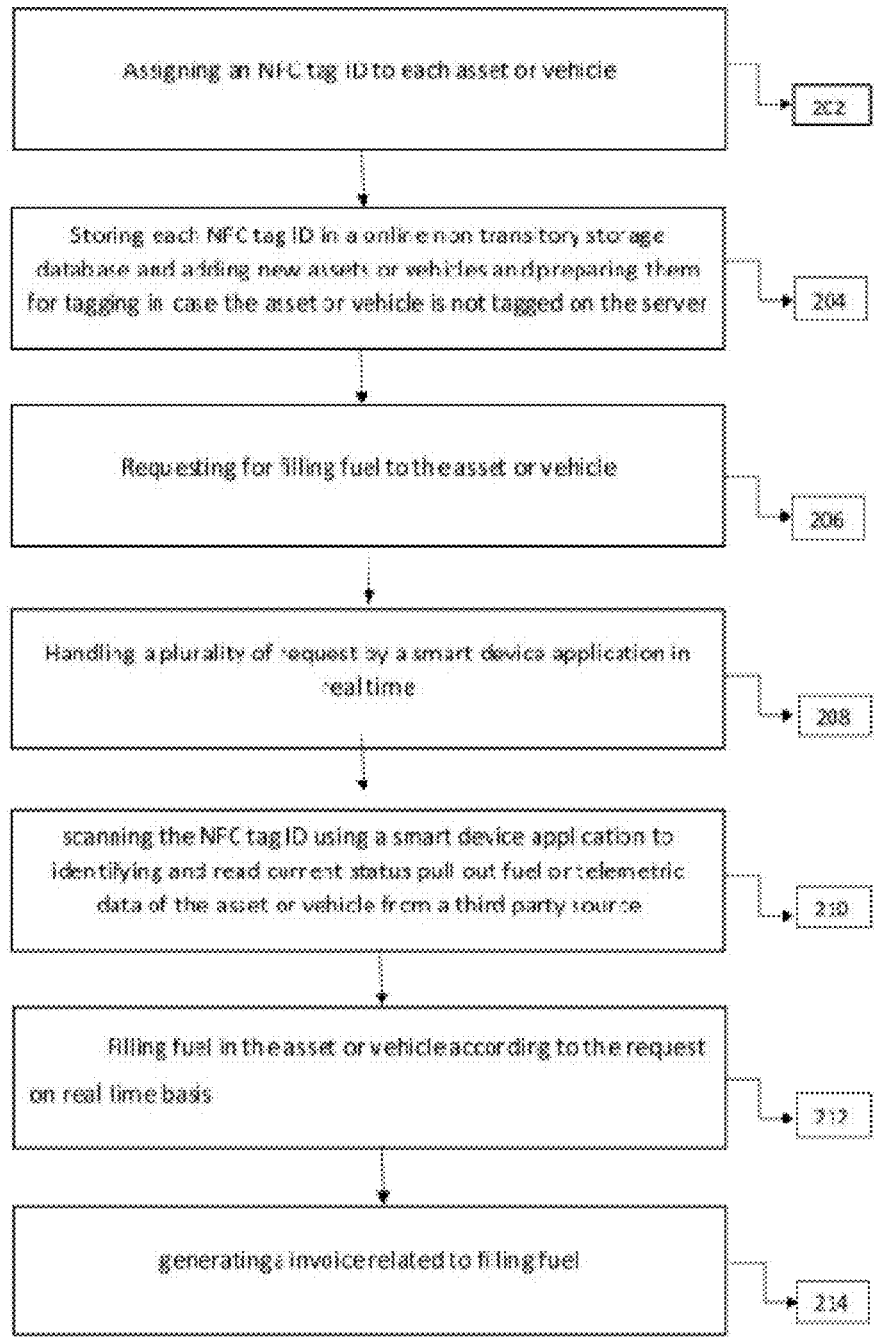
FIG. 5 illustrates a vehicle refueling method flow diagram for automated fill identification, tracking and billing.

FIG. 5 is an illustration of a vehicle refueling method (200) flow diagram for automated fill identification, tracking and billing. The method (200) mainly comprises assigning an NFC tag ID to each asset or vehicle of the client by the driver at step (202). Once the NFC tag ID is assigned, each NFC tag ID is stored in the post GRE SQL database corresponding to asset or vehicle of the client at step (204). After storing NFC tag ID in the post GRE SQL database, scanning of NFC tag ID of each asset or vehicle is initiated using a smart phone application to pull out fuel or telematic data of the asset or vehicle from a third party source at step (206). The telemetric data may be used to determine whether the asset has a full fuel tank already or not. The NFC ID tag further provides geo-fencing to the asset/vehicle and prohibits a fill from occurring if the fill is occurring outside of the asset/vehicle's approved geo-fence. The NFC ID tag is used to determine the fuel type to be delivered to a particular asset/vehicle, where the fuel type ranges from gas, diesel, premium etc. The smart phone application is then embedded with logic to provide fuel related invoices to client on real time basis at step (208). The final step involves adding new assets or vehicles and preparing them for tagging in case the asset or vehicle is not tagged on the server at step (210).

As mentioned, there remains the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automated system for a vehicle fueling service comprising:
   a plurality of first users with a smart device preloaded with a software application, with at least one of the first users associated with a carrier of a mobile fuel dispensing unit;
   an online server configured for interaction between the first user and a plurality of second users; and
   an online non-transitory storage database for storing information corresponding to an asset or a vehicle, wherein:
      the smart device is communicatively coupled to an NFC tag stuck to each asset or vehicle for their identification and further accessing the information;
      the software application comprises an integrated automated billing module for creation of an invoice in real time and is configured to allow the first users to handle a plurality of requests for using the vehicle fueling service at a time;
      the carrier of the mobile fuel dispensing unit comprises a wireless transponder;
      the NFC tag stuck to each of the asset or vehicle is used to determine a fuel type to be delivered to a particular asset or vehicle;
      the software application is configured to add information corresponding to the asset or vehicle to the online non-transitory storage database in preparation for tagging, upon determining that the asset or vehicle is untagged; and
      an NFC tag ID of the NFC tag is configured to provide geo-fencing to the asset or the vehicle, and to prohibit the at least one of the first users from providing fuel of the determined fuel type from the carrier of the mobile fuel dispensing unit to the asset or the vehicle, if the asset or the vehicle is located outside of the asset's or vehicle's approved geo-fence dynamically generated to establish a virtual geographic perimeter area within which the asset or the vehicle is allowed to be refueled with the fuel of the determined fuel type within the carrier.

2. The automated system for a vehicle fueling service as claimed in claim 1, wherein the first user is a driver of the carrier of the mobile fuel dispensing unit and the second user is a client who requests for vehicle fueling service.

3. The automated system for a vehicle fueling service as claimed in claim 1, wherein the online non-transitory storage database is a PostgreSQL database.

4. The automated system for a vehicle fueling service as claimed in claim 1, wherein the carrier of the mobile fuel dispensing unit comprises a state regulated fuel meter that is periodically checked and verified to ensure a correct measurement of a fuel being delivered to the asset or the vehicle and has an ability to interact with the smart device wirelessly by means of the wireless transponder to update the first user or second user on real time basis of a measure of the fuel delivered to the asset or vehicle.

5. The automated system for a vehicle fueling service as claimed in claim 4, wherein an NFC tag ID of the NFC tag is used to pull data including one of a vehicle location data or a fuel level data from a third party source, the third party is a telemetric unit attached to the asset or the vehicle.

6. The automated system for a vehicle fueling service as claimed in claim 1, wherein the integrated automated billing module is configured to create the invoice in real time, the invoice is related to a bill generated due to a filling of a fuel during which the vehicle is within the dynamically generated approved geo-fence.

7. The automated system for a vehicle fueling service as claimed in claim 1, the automated system comprises an EV charging module.

8. The automated system of claim 1, wherein the software application is configured to determine whether the asset or vehicle has a full tank, based on telemetric data including one of a vehicle location data or a fuel level data from the asset or vehicle.

9. The method as claimed in claim 1, wherein the invoice is based on the filling of the fuel during which the vehicle is within the dynamically generated approved geo-fence.

* * * * *